United States Patent [19]

Moosmayer et al.

[11] Patent Number: 4,904,174
[45] Date of Patent: Feb. 27, 1990

[54] APPARATUS FOR ELECTRICALLY CHARGING MELTBLOWN WEBS (B-001)

[76] Inventors: Peter Moosmayer, 1c, Ch. de Gilly, Grand-Lancy, Geneva, Switzerland, 1212; Jean-Pierre Budliger, 31, Rte de Loex, Onex, Geneva, Switzerland, 1213; Erwin Zurcher, 21, Ave. du Lignon, Le Lignon, Geneva, Switzerland, 1219; Larry C. Wadsworth, 2024 Bishop's Bridge Rd., Knoxville, Tenn. 37922

[21] Appl. No.: 245,137

[22] Filed: Sep. 15, 1988

[51] Int. Cl.⁴ .................. B29C 47/30; B29C 71/04
[52] U.S. Cl. .................. 425/174.8 E; 264/22; 425/72.2; 425/464
[58] Field of Search .............. 425/174.85 E, 174.8 R, 425/72.2, 131.5, 464; 264/22, 24, DIG. 48

[56] References Cited
U.S. PATENT DOCUMENTS

| | | | |
|---|---|---|---|
| 2,108,361 | 2/1938 | Asakawa | 425/174.8 E |
| 3,163,753 | 12/1964 | Disabato et al. | 264/24 |
| 3,820,929 | 6/1974 | Busby et al. | 425/174.8 E |
| 3,860,369 | 1/1975 | Brethauer et al. | 264/22 X |
| 4,009,508 | 3/1977 | Sternberg | 425/174.8 E X |
| 4,215,682 | 8/1980 | Kubik et al. | 264/22 X |
| 4,375,718 | 3/1983 | Wadsworth et al. | 264/22 X |
| 4,534,918 | 8/1985 | Forrest, Jr. | 425/174.8 E X |
| 4,588,537 | 5/1986 | Klaase et al. | 264/22 |
| 4,592,815 | 6/1986 | Nakao | 264/22 X |

Primary Examiner—Richard L. Chiesa
Attorney, Agent, or Firm—Robert L. Graham

[57] ABSTRACT

Meltblowing apparatus includes electrodes spaced from the meltblowing die discharge and protruding grounded emitters positioned proximate the die discharge. The preferred emitters are in the form of pointed pins spaced along and flanking the die discharge.

12 Claims, 4 Drawing Sheets

APPARATUS FOR ELECTRICALLY CHARGING MELTBLOWN WEBS (B-001)

BACKGROUND OF THE INVENTION

This invention relates generally to a process and apparatus for producing fibrous electrically charged nonwoven webs. In one aspect, the invention relates to the manufacture of electrically charged meltblown fibrous materials by applying a charge to meltblown fibers during the meltblowing process.

Meltblowing is a one step process in which a molten thermoplastic resin is extruded to form a plurality of fibers. Converging sheets of high velocity air blows the fibers unto a collector screen where they are entangled and collected forming a nonwoven web. These webs, called meltblown nonwoven fabrics, have excellent properties for many uses, one of which is filtration of gas and liquids.

The microscopic diameters of the entangled fibers of the meltblown web are ideally suited for filtering finely divided particles out of a gaseous or liquid media. It is also known that filtration efficiency of these nonwoven materials can be improved by applying an electrostatic charge to the fibers. The charges on the webs are frequently called electrets. U.S. Patents which disclose nonwoven fibrous electrets include U.S. Pat. Nos. 4,215,682, 4,375,718, 4,588,537, and 4,592,815.

A process for applying the electric charge to the molten or hot fibers during the meltblowing process is disclosed in U.S. Pat. No. 4,215,682. The electrostatic charging of the fibers in the hot or molten state of the polymer permits the charges to migrate into the polymer (since its electrical resistance is lower) and remain trapped upon cooling of the polymer. This increases the charge life of the electret.

In the process disclosed in U.S. Pat. No. 4,215,682, the charge is achieved by passing the extruded fibers through a electrostatic field established by two charge sources, one source above and one below the extruded fiber stream. Each source includes an electrode wire and a ground shell. A high voltage charge to each electrode establishes an electrostatic field between the conductor wire and the ground. The intensive electrostatic field ionizes air or other gases around the conductor wire. (The effect may be enhanced by using a grounded shell around part of the conductor wire.) The ions and charged particles thus produced are propelled into the fibrous stream. A problem associated with this system is that of propelling the charged particles into the fiber stream, particularly at or near the die discharge where the fibers are the hottest. A substantial portion of the fiber stream does not pass through the corona zone. The patent states that the ions or charged particles are propelled into the stream by aerodynamics and electrostatic forces and that a fan may be used to assist this action.

SUMMARY OF THE INVENTION

In accordance with the present invention a meltblowing apparatus is equipped with an improved electrostatic charge system for creating a corona zone at or near the meltblowing die discharge. The meltblowing apparatus may be conventional comprising a die having a row of orifices through which molten thermoplastic resin is extruded forming a row of fibers. Converging hot air streams are blown on the fibers forming a fiber-air stream.

The improved electrostatic charge system includes a pair of grounded electron emitter means mounted on the die (one on each side of the die discharge) and a pair of collector electrodes (one on each side of the fiber-air stream) which are connected to a high voltage source for charging the electrodes.

The emitter means protrude outwardly from the die generally in the direction of the fiber-air stream flow and terminate near the die discharge. The electrostatic field between the electrodes and emitter means is established by high voltage charge which creates a corona zone at or near the die discharge. The electrons and ions in the corona zone thus contact the molten or hot fibers discharged from the die discharge. It is significant that the corona zone is at the grounded emitters and not the electrodes as taught by U.S. Pat. No. 4,215,682. This establishes the corona zone at or near the die discharge.

The preferred emitters are in the form of pins spaced along and on both sides of the die discharge. The tips of the pins are pointed and terminate near the die discharge.

The process of the present invention is characterized by the steps of (a) extruding molten thermoplastic resin through a plurality of orifices to form a plurality of molten fibers, (b) blowing convergent hot air on both sides of the fibers to extend the fibers thereby forming a fiber-air stream, (c) establishing an electrostatic field between (i) two electrodes on either side of the stream and (ii) grounded electron emitters on either side of the die discharge whereby fibers passing between the emitters are charged; and (d) collecting the charged fibers to form a fibrous electrically charged web.

An important feature of the invention is the high emission of electrons from the emitters, particularly from the emitter pins. This creates a corona zone at or near the die discharge. Unlike the system disclosed in U.S. Pat. No. 4,215,682 the present invention avoids the problem of bringing the charged particles (essentially electrons and ions) in contact with the molten or hot fibers since the fibers-air stream flows essentially through the corona zone.

Tests have shown that charging the molten or hot fibers in accordance with the present invention produces a filter of exceptional filtration efficiency. Although the present invention is described in relation to filtration applications, it should be pointed out that electrically charged webs may have other applications. The filtration efficiency test is an effective test for determining the charge of the webs, even if the webs are used for other applications.

DESCRIPTION OF THE PREFERRED EMBODIMENTS

Figure 1:
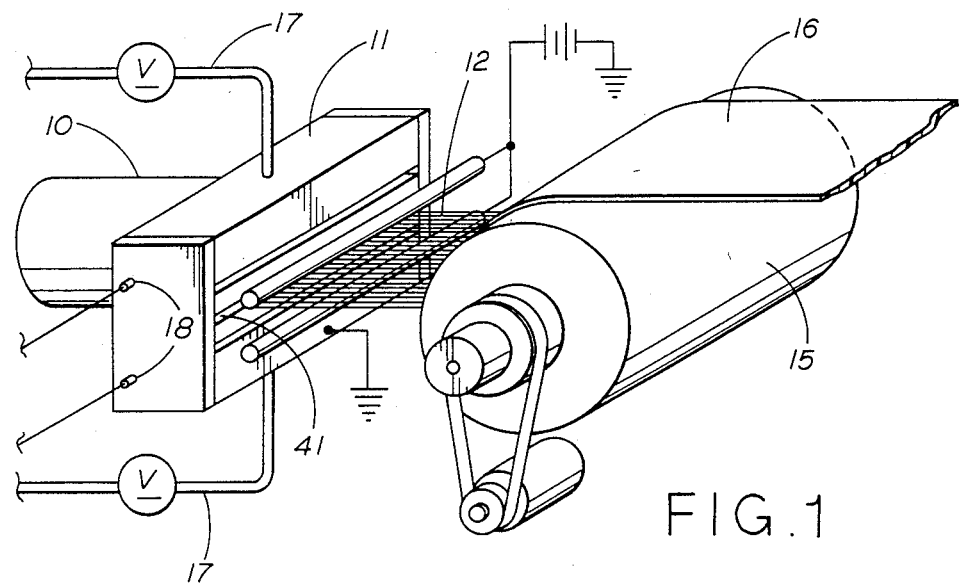
FIG. 1 is a schematic illustrating the main components of a meltblown line provided with the electrostatic apparatus of the present invention.

As mentioned previously, the present invention relates to the electrostatic charging of meltblown molten or hot fibers to produce electrically charged nonwoven webs. A meltblown line with electrostatic charging equipment is illustrated in FIG. 1 as comprising an extruder 10 for delivering molten resin to a meltblowing die 11 which extrudes fibers into converging hot air streams discharging a fiber-air stream 12 from the die discharge opening, and a rotating collector drum or screen 15 for separating the fibers and air. A web 16 is withdrawn from the screen 15. The typical meltblowing line will also include an air source connected to the die 11 through valved lines 17 and heating elements 18.

Figure 2:
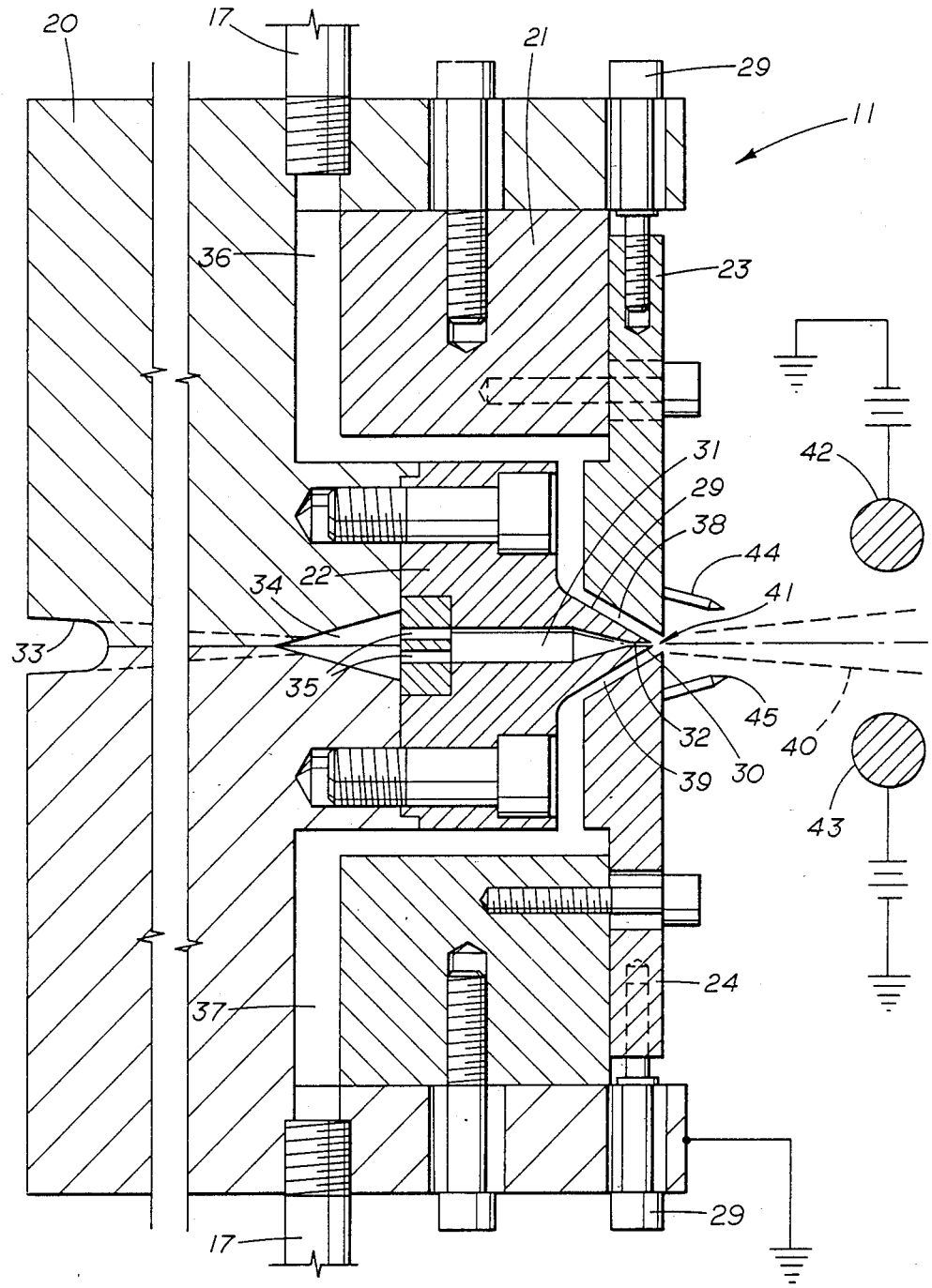
FIG. 2 is a cross-sectional view of a meltblowing die illustrating protruding emitters in relation to the die fiber discharge.

As shown in FIG. 2, the die 11 includes body members 20 and 21, an elongate die nosepiece 22 secured to the die body 20 and air knives 23 and 24. The nosepiece 22 has a converging section 29 of triangular cross section terminating at tip 30. A central elongate passage 31 is formed in the nosepiece 22 and a plurality of side-by-side orifices 32 are drilled in the tip 30. The die components are generally manufactured from high quality steel to provide durability. Molten polymer is delivered from the extruder through the die passages 33, 34 (coat hanger configuration) 35, 31, and extruded as micro-sized side-by-side fibers from the orifices 32.

The air knives 23 and 24 with the body members 20 and 21 define air passages 36 and 37. The air knives 23 and 24 have tapered inwardly facing surfaces which in combination with the tapered surfaces of the nosepiece 29 define converging air passages 38 and 39. As illustrated, the flow area of each air passage 38 and 39 is adjustable. Air is delivered from an air source via lines 17 through the air passages and is discharged onto opposite sides of the molten fibers as converging sheets of hot air. The converging sheets of hot air draw or attenuate the fibers forming a fiber and air stream 40 discharging from die discharge 41.

In accordance with the present invention, the meltblowing apparatus shown in FIG. 2 is provided with means for applying electrostatic charges to the fibers as they discharge from the die discharge opening 41. The electrostatic field is established by two electrodes 42 and 43, one placed above the stream 40 and the other below the stream 40 but equidistant from the center line of the stream 40. For reference purposes the center line of the stream is the direction of orientation of the orifices. The electrodes may be mounted on the same frame as that supporting the die to provide common ground.

Protruding electron emitters, illustrated as pins 44 in FIG. 2, are secured to the die air knives 23 and 24. Although the protruding emitters on either side of the die discharge 41 may be in a variety of shapes such as a blade or a wire, the preferred emitters are pins 44 as illustrated. One row of pins 44 extends along the die above the die opening 41 and a second row of the pins extend along the die below the opening 41. The pins 44 are slanted toward the fiber-air stream and terminate in points 45.

The slant angle of the pins 44 is not critical but serves to locate the pin tips 45 close to the fiber-air stream without interfering with the stream flow.

The spacing of the pins 44 and electrodes 42 and 43 are described in more detail below.

A high voltage source is connected to electrodes (top/bottom) and the polarity is controlled so that the electrodes may have a $+/+$ charge, $+/-$ charge, $-/+$ or $-/-$ charge. This establishes a electrostatic field between the electrodes 42 and 43 and the grounded emitters 44. This in turn creates a corona zone around emitter tips 45 near the die discharge 41.

The molten or hot fibers passing through the corona zone are charged by electrons or charged particles.

As indicated above, the equipment for installation onto a meltblown line comprises the electrodes, a high voltage source, and the emitters. Specific examples of these components are described below.

Electrodes: The electrodes 42 and 43 may be in the shape of metal (electrically conductive) bars as illustrated in the drawings. The bars may have a diameter ranging from 2" to a thin wire (e.g. 1/16 inch diameter). As described in more detail below, the electrode spacing should be as small as possible without interfering with the fiber-air stream flow. Electrode diameters of ¼" to 1" are preferred. Also useable as electrodes are permeable, reticulated metal wires shaped as flat vanes or ovals. The openings between metal wires forming the fence-like or perforated material permits air to flow through the electrode with minimum interference of the fiber-air stream. The electrodes 42 and 43, regardless of shape and form, are mounted on insulators (e.g. ceramic) and connected to the high voltage source.

High Voltage Source: Any high voltage d.c. source may be used. The source should have variable voltage settings (e.g. between 10 KV and 25 KV) and preferably $(-)$ and $(+)$ polarity settings to permit adjustments in establishing the electrostatic field. A high voltage power source marked by SIMCO, of Hatfield Pa., has proven quite adequate for purposes of this invention. This source has the following specification:

Max. voltage—25 kV DC
Output polarity—neg. and pos.
Max. current—6.3 MA with electrode connected.

Emitters: As described previously, the emitters are preferably in the form of sharp pointed electric conductive pins 44 spaced along and flanking the die discharge outlet 41. The pins are narrow having, for example, diameters in the range of 1/16 to ⅛ inch.

Figure 3:
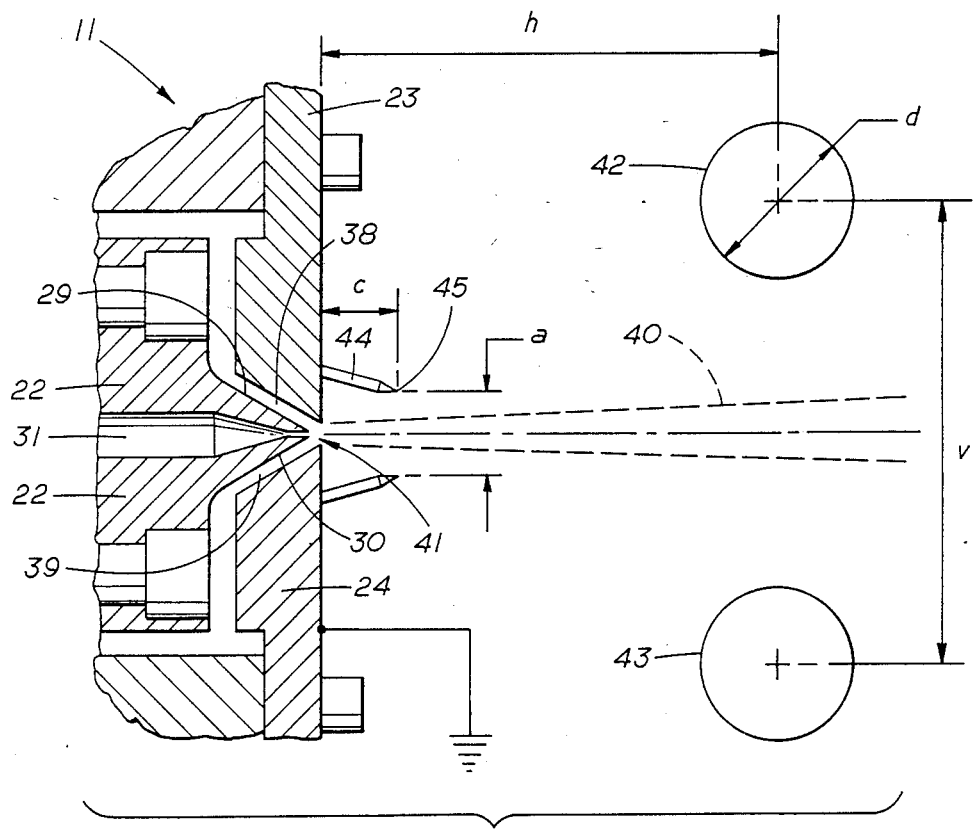
FIG. 3 is a schematic view illustrating the preferred electrostatic charge system of the present invention.
Figure 4:
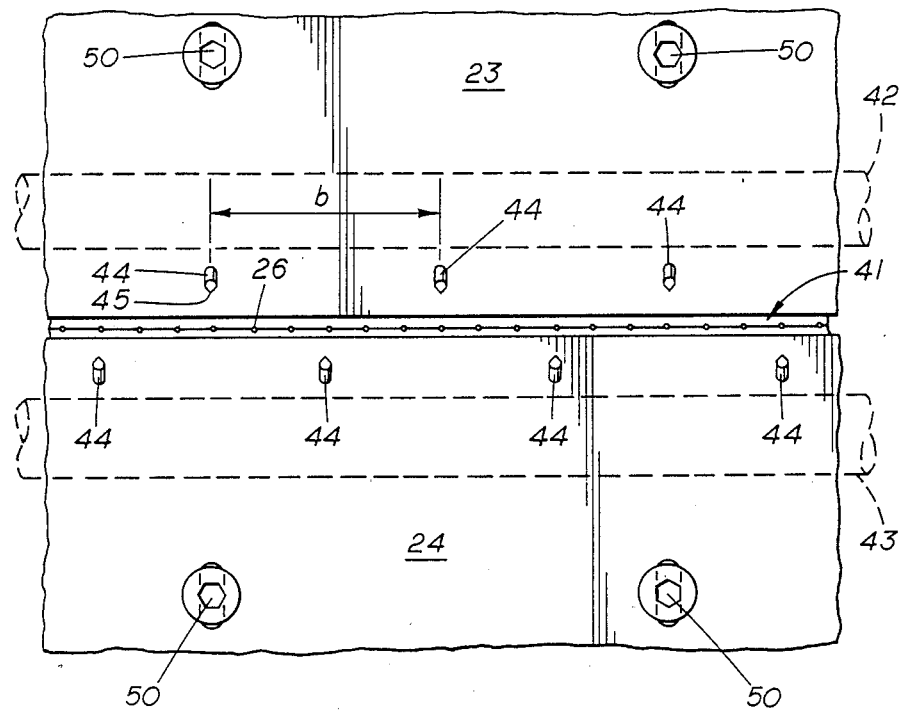
FIG. 4 is a front elevation view of the die of FIG. 3 illustrating the horizontal spacing of the emitter pins in relation to the die discharge.
Figure 5:
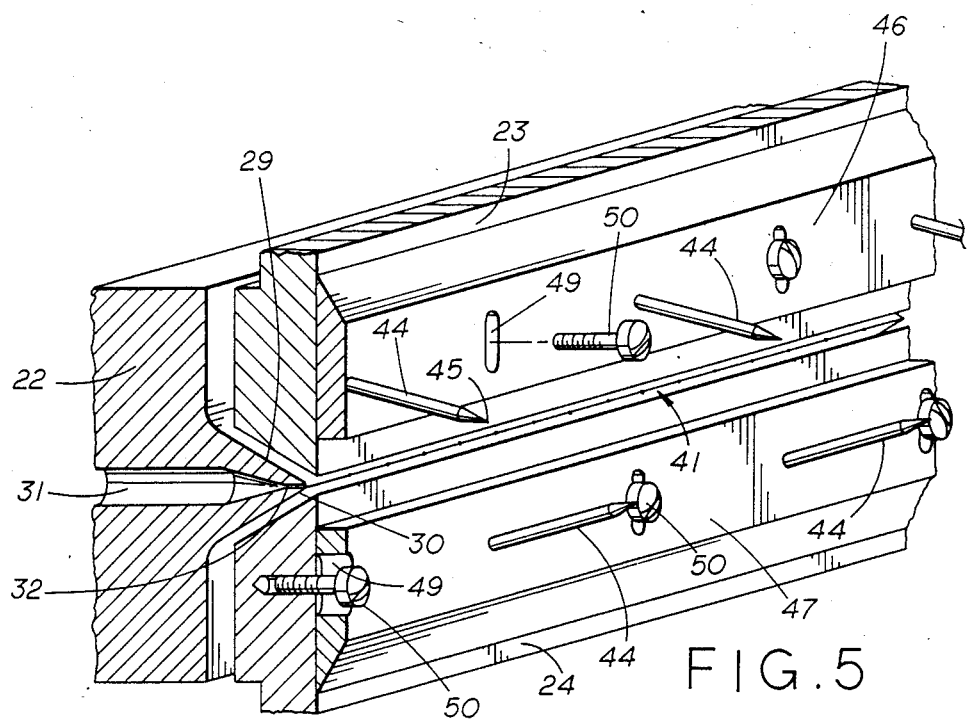
FIG. 5 is an enlarged perspective view illustrating the adjustable mounting for the emitter pins on the die.

The pins 44 may be mounted directly on the face of the air knives 23 and 24 as illustrated in FIGS. 2, 3, and 4 by welding or by insertion into properly drilled holes. Alternatively, the pins 44 are mounted on narrow plates 46 and 47 (as illustrated in FIG. 5) which in turn are mounted on air knives 23 and 24 by means of threaded bolts 50 passing through slots 49. This arrangement permits adjustment of the vertical spacing of the pin tips 45.

Also usable (not illustrated in the drawings) are a pair of grounded blades mounted on opposite sides of the die discharge and each having a sharp edge positioned near the die discharge outlet 41. A pair of wires flanking the die discharge outlet 41 may also be used.

Figure 6:
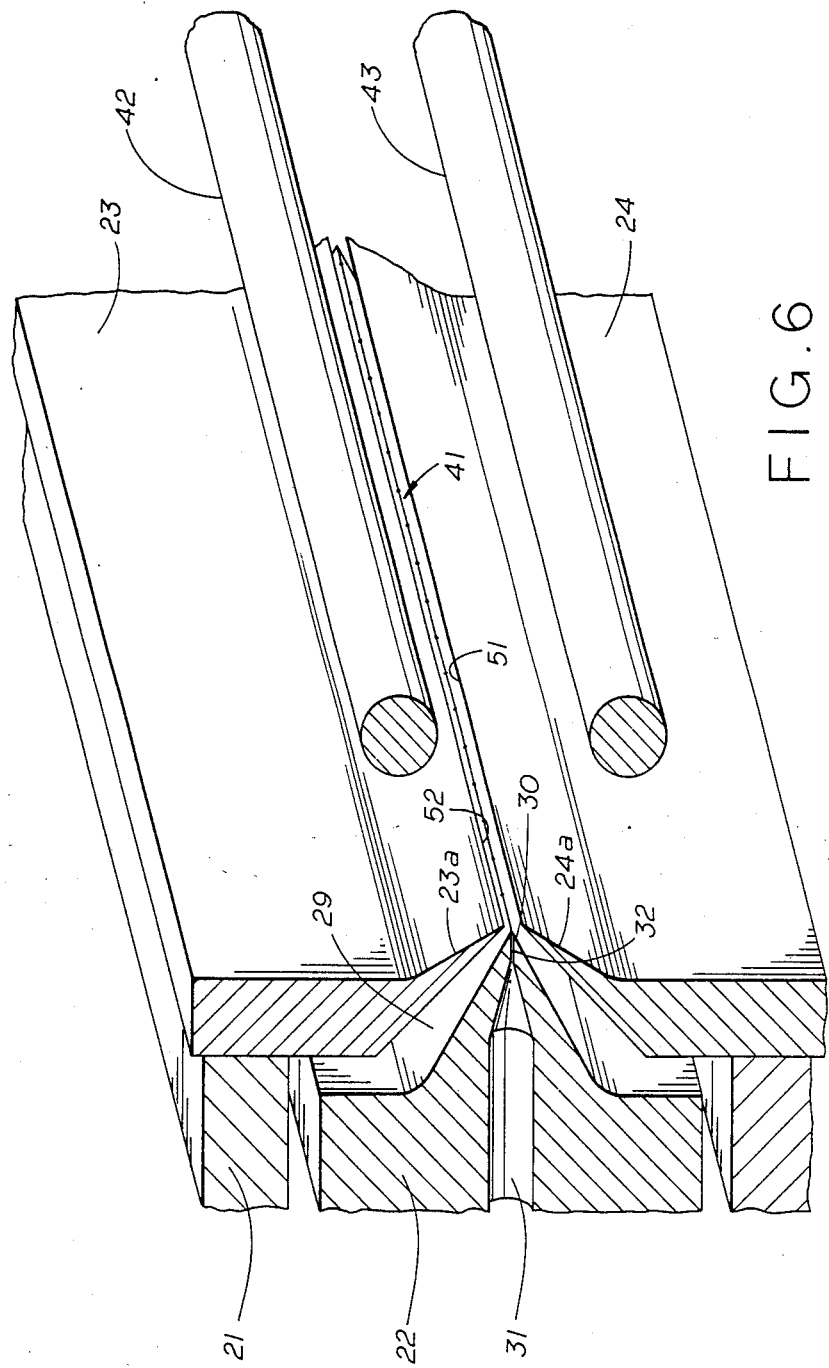
FIG. 6 is a schematic illustrating another emitter useful in the present invention.

Another preferred emitter construction is illustrated in FIG. 6. In this embodiment the air knives 23 and 24 are provided with outwardly protruding lips 23a and 24a terminating in sharp edges 51 and 52. The edges 51 and 52 serve as the emitters in creating the corona zone. As illustrated in all of the drawings the emitters, regardless of their form, are grounded. A combination of emitter construction may be used (e.g. protruding air knives with pins spaced thereon).

The bars 42 and 43 and emitter means, of course, should traverse the full length of the die discharge opening 41.

Spacing of the Electrostatic Components

The spacing of the electrodes and emitters can be important in the performance of the electrostatic system. The significance of the spacing will be described with references to FIGS. 3 and 4 wherein the letters presented therein represent the following:

(a) emitter pin vertical spacing
(b) emitter pin horizontal spacing
(c) emitter pin tip spacing from die face
(d) electrode diameter
(h) electrode horizontal spacing
(v) charging bar vertical spacing The spacing (a) of pin ends 45 should be as close as possible without interfering with the flow of fiber in stream 40. The length (c) should be short, preferably about 0.2 to 0.6, most preferably 0.2 to 0.4, of (h) to localize the corona zone near outlet 41. The horizontal spacing (b) does not appear critical, provided sufficient corona zone is established along the length of the die discharge opening 41. The diameter (d) of the electrodes should be large (vis-a-vis a wire) but not so large as to interfere with fiber flow, and the spacings (v) and (h) should be small (close to the fiber-air stream 40 and the die 11 respectively). Dimensions (d) and (v) should be sized to avoid interference with the flow of fibers in stream 40. The dimension (h) should be greater than the distance between tips 45 and the axis of its associated bar to avoid electrical arcing between the bar and the die air knife.

It is understood that the dimensions indicated herein as vertical or horizontal are only relative to die orientation. In vertically oriented dies, the dimensions (v) and (h) would represent horizontal and vertical dimensions, respectively. The invention contemplates any orientation of the die.

The following represents the broad range and preferred range of the dimensions.

| Dimension | Broad Range (inches) | Preferred Range (inches) | Most Preferred Range (inches) |
|---|---|---|---|
| Pins | | | |
| (a) | 0.25 to 1.0 | 0.3 to 0.9 | 0.4 to 0.7 |
| (b) | 0.25 to 3.0 | 0.5 to 2.5 | 0.5 to 1.5 |
| (c) | 0.25 to 1.5 | 0.4 to 1.0 | 0.4 to 0.7 |
| Electrodes | | | |
| (d) | 1/16 to 2.0 | ⅛ to 1.5 | ¼ to 1.0 |
| (h) | 1.0 to 5.0 | 1.0 to 3.0 | 1.5 to 3.0 |
| (v) | 1.0 to 5.0 | 1.5 to 4.0 | 2.0 to 3.0 |

Operation

In operation, the electrostatic charge equipment will be mounted on a meltblowing line. The line may employ any of the thermoplastic resins capable of use in meltblowing. The preferred polymer is polypropylene, but other polymers may be used such as low and high density polyethylene, ethylene copolymers (including EVA copolymer), nylon, polyamide, polyesters, polystyrene, poly-4-methylpentene-1, polymethylmethacrylate, polytrifluorochloroethylene, polyurethanes, polycarbonates, silicones, and blends of these.

The meltblowing line produces fibers less than 10 microns, typically 1 to 5 microns.

The line is started and once steady state operation is achieved, the electrostatic charge system may be activated. Adjustments may be required to optimize performance of the electrostatic equipment.

EXPERIMENTS

Experiments were carried out on the electrostatic charging of nonwoven fibers during the production of nonwoven webs. Several parameters including charge voltage, electrode polarity and spacing and sizing of the electrostatic charge equipment were varied. The test equipment and materials included the following:

Meltblowing Die: 20 inch width with twenty 0.015 orifices per inch; extrusion temp. 450°–550° F.; polymer flow rate: 0.2 to 0.8 grams per minute per orifice.
Electrodes: metal bars or wires
Pins: 1/16 inch in diameter (steel)
Resin: polypropylene (PP 3145 marketed by Exxon Chemical Co.)

Filtration Efficiency Measurements:

The effect of the electrostatic charge was determined by filtration tests using the following equipment:

Apparatus: Refined Surgikos FET apparatus (described in "Automated Test Apparatus for Rapid Simulation of Bacterial Filtration Efficiency"; L. C. Wadsworth; 13th Technical Symposium, International Nonwovens and Disposable Assoc.; June 4–6. 1985; Boston)

Aersosol: 10% suspension of 0.8 micrometer latex spheres in a distilled water fog.

Counting: Optical particle counter Filtration efficiency (%):

$$\text{Filtration efficiency (\%)}: \frac{\text{(retained particles)}}{\text{(total particles)}} \times 100$$

Electret measurement system
Sample size: 5×5 inches nonwoven web specimens
Instrument: Keithly Electrometer Model 610C with 3.9 inch metal cone probe.

Measurement method: The cone probe was vertically mounted with the large diameter end upward. A plastic spacer was placed on top of the cone. The height of the spacer required to give accurate voltage reading of a metal plate connected to a power supply was previously determined. Each web tested was placed on the plastic spacer. A grounded metal plate was then placed on the web and the test carried out to determine surface potential.

Test Procedure:

Nonwoven webs were made under variable conditions (e.g. changes in voltage, polarity, and spacings) and tested for filtration efficiency and surface potential. Numerous tests were carried out. The data shown in Table I are representative of the tests. Table II represents comparative results for web prepared without charges.

The experiments indicate that electrostatic charging of the fibers produced a fibrous electrically charged with excellent filtration properties. The experiments also indicate that the following parameters are important to achieve optimum results:

1. polarity electrodes (+/+)
2. High voltage (20 to 25 kV)
3. rigid electrodes (at least ½ inch) (Tests using ⅛ wire electrodes presented problems of electrostatic inability.)

4. rigid electrode with close vertical spacing (v) without interference with fibers in stream 40.
5. rigid, sharp pointed and grounded pins.

Although the present invention has been exemplified in connection with electrically charged nonwoven meltblown webs which are useful as filters, the invention may be used to produce electrically useful in a variety of applications.

TABLE I

| Sample No. | Charging Condition Top/Bottom KV(+) | Bars d (in.) | Bars h (in.) | Bars v (in.) | Pins a (in.) | Pins b (in.) | Pins c (in.) | Sample wt (g) | Basis wt (oz./yd²) | Sample thickness mil | Surface Potential Screen (V) | Surface Potential Face (V) | Filtr. eff % |
|---|---|---|---|---|---|---|---|---|---|---|---|---|---|
| I-1 | +25/+25 | 1 | 3 | 4 | 0.5 | 0.5 | 0.5 | — | 1 | — | — | — | 96.1 |
| I-2 | −25/+25 | 1 | 3 | 4 | 0.5 | 0.5 | 0.5 | — | 1 | — | — | — | 92.5 |
| I-3 | −25/−25 | 0.5 | 3 | 3.5 | 0.5 | 0.5 | 0.5 | — | 1 | — | — | — | 90.6 |
| I-4 | +25/+25 | 0.5 | 2 | 2.5 | 0.5 | 0.5 | 0.5 | — | 1 | — | — | — | 98.8 |
| II-1 | +25/+25 | 0.125 | 2 | 2 | 0.5 | 0.5 | 0.5 | 0.5282 | 0.97 | 11 | — | — | 99.7 |
| II-2 | +20/+20 | 0.5 | 2 | 2.5 | 0.5 | 0.5 | 0.5 | 0.5342 | 0.98 | 11 | — | — | 99.7 |
| II-3 | +15/+15 | 0.5 | 2 | 2.5 | 0.5 | 0.5 | 0.5 | 0.5388 | 0.99 | 11 | — | — | 92.6 |
| II-4 | +25/+25 | 0.5 | 2 | 2 | 0.375 | 0.5 | 0.5 | 0.5601 | 1.02 | 12 | — | — | 99.5 |
| III-1 | +25/+25 | 0.5 | 2 | 2.5 | 0.5 | 0.5 | 0.5 | 0.5587 | 1.02 | 11.6 | −212.2 | 125.8 | 99.7 |
| III-2 | +25/+25 | 0.5 | 2 | 2.5 | 0.5 | 1.5 | 0.5 | 0.5607 | 1.03 | 11.6 | −146.0 | 113.4 | 99.6 |
| III-3 | +25/+25 | 0.5 | 2 | 2.5 | 0.5 | 2.5 | 0.5 | 0.5401 | 0.99 | 10.9 | −85.3 | 142.5 | 99.6 |
| IV-1 | +25/+25 | 0.5 | 2.25 | 2.5 | 0.88 | 0.5 | 1.25 | 0.6072 | 1.11 | 11.9 | 86.8 | −30.5 | 98.6 |

TABLE II

| Sample No. | Top/Bottom KV(+) | Sample wt (g) | Basis wt (oz./yd²) | Sample thickness mil | Surface Potential Screen (V) | Surface Potential Face (V) | Filtr. eff % |
|---|---|---|---|---|---|---|---|
| I-C | 0/0 | — | 1.00 | — | — | — | 91.9 |
| II-C | 0/0 | 0.5519 | 1.01 | 12 | — | — | 87.6 |
| III-C | 0/0 | 0.5658 | 1.04 | 12.0 | −23.9 | −17.7 | 88.30 |
| IV-C | 0/0 | 0.5906 | 1.08 | 12.8 | −36.1 | −22.6 | 88.0 |

What is claimed is:

1. A meltblown apparatus for manufacturing meltblown electrostatic charged webs which comprises
   (a) an elongate die having a plurality of orifices formed in a die tip thereof and being electrically grounded;
   (b) means for extruding molten thermoplastic resin through the die tip orifices to form a plurality of side-by-side fibers;
   (c) means for blowing converging air streams on the fiber extruded from the die tip orifices to form a fiber-air stream;
   (d) a pair of elongate and horizontal electrodes spaced from the outlets of the die tip orifices, one electrode being above the fiber-air stream and one below the fiber-air stream;
   (e) a pair of emitter means secured to the die and being electrically grounded thereto and protruding outwardly therefrom, one emitter means being positioned above the die tip and the other below the die tip, and each emitter means having an outer end in close proximity to the die tip orifice outlets; and
   (f) means for applying a high voltage source with positive polarity to the electrodes to establish an electrostatic field between the electrodes and the emitter means.

2. The apparatus of claim 1 wherein each emitter means comprises a first row of pins secured to the die and spaced along and above the die tip orifices and a second row of pins secured to the die and spaced along and below the die tip orifices.

3. The apparatus of claim 2 wherein the outer ends of the pins are pointed, and the first row outer ends being vertically spaced from ¼ to 1 inches from the second row outer pin ends.

4. The apparatus of claim 3 wherein the vertical spacing of the pins is from 0.3 to 0.7 inches.

5. The apparatus of claim 3 wherein the pins of the first row are horizontally staggered from the pins of the second row.

6. The apparatus of claim 3 wherein the outer ends of the pins are from 0.25 to 1.5 inches from the die outlet.

7. The apparatus of claim 1 wherein the electrodes are bars having a diameter between 1/16 to 2 inches and are vertically spaced apart from 1.0 to 5.0 inches.

8. The apparatus of claim 7 wherein the electrodes are horizontally spaced from the die by 1.0 to 5.0 inches.

9. A meltblowing apparatus for manufacturing meltblown electrostatic charged webs which comprises
   (a) an elongate die having a plurality of orifices formed in a die tip thereof and being electrically grounded;
   (b) means for extruding molten thermoplastic resin through the die tip orifices to form a plurality of side-by-side fibers;
   (c) means for blowing converging air streams on the fiber extruded from the die tip orifices to form a fiber-air stream;
   (d) a pair of elongate and horizontal electrodes having a diameter between ⅛ inch and 1½ inch and spaced equidistant from the outlets of the die tip orifices, one electrode being above the fiber-air stream and one below the fiber-air stream and spaced equally from the center line thereof;
   (e) a first row of emitter pins secured to the die above the die outlet and spaced therealong and electrically grounded thereto, and a second row of emitter pins secured to the die below the die outlet and spaced therealong and electrically grounded thereto, the tips of the pins being horizontally spaced from the die by 0.4 to 1.0 inch and the tips of the first row of pins being vertically spaced from the tips of the second row of pins by 0.3 to 0.9 inches; and (f) means for applying at least 20 kv to each electrode with positive polarity.

10. In a meltblowing apparatus wherein a stream of fibers and air are discharged from an elongate die outlet, said fibers being discharged from a row of orifices formed in the die and the air from passages flanking the orifices, an improved apparatus for electrically charging the fibers in said stream comprising:
(a) a first row of conductive pins secured to the die above the die outlet and electrically grounded thereto, and extending outwardly from the die in the direction of orifice orientation and terminating in tips located above the center line of the fiber stream, and said die being electrically grounded;
(b) a second row of conductive pins secured to the die below the die outlet and electrically grounded thereto, and extending outwardly from the die in the direction of orifice orientation and terminating in tips located below the center line of the fiber stream;
(c) a first electrode horizontally spaced from the die in the direction of orifice orientation and being positioned above the orifices;
(d) a second electrode horizontally spaced from the die in the direction of orifice orientation and being positioned below the orifices; the vertical spacing between the electrodes being such to avoid interference with flow of fibers; and
(e) a power source connected to each electrode to create an electric field between the pins and the electrodes and a corona zone at the pin tips, with the electrodes having a positive polarity.

11. The apparatus of claim 10 wherein the electrodes are equally horizontally spaced from the die and each has a diameter between $\frac{1}{8}$ to $1\frac{1}{2}$ inch and a voltage from 15 kv to 25 kv and each has a positive polarity.

12. The apparatus of claim 11 wherein the pins of the first row are horizontally staggered from the pins of the second row and are horizontally spaced from the die by a distance of 0.2 to 0.6 of the horizontal spacing of the electrode axis from the die.

* * * * *